United States Patent Office 3,408,159
Patented Oct. 29, 1968

3,408,159
PREPARATION OF AMORPHOUS ALUMINA
Stanislas Jean Teichner, Lyon, France, Charles Lamar Thomas, Swarthmore, Pa., and Van Can Hoang, Dijon, France, assignors to Sun Oil Company, Philadelphia, Pa., a corporation of New Jersey
No Drawing. Filed Jan. 4, 1965, Ser. No. 423,391
3 Claims. (Cl. 23—143)

ABSTRACT OF THE DISCLOSURE

Preparation of amorphous metallic oxides by the addition of dilute solution of a metal salt to a saturated solution of ammonium carbonate or ammonium bicarbonate at a temperature in the range of −10° C. to 50° C. and subsequently recovering the amorphous product.

---

This invention relates to amorphous metallic oxides and a method for preparing the same. More particularly, this invention relates to a method for preparing amorphous metallic oxides which have particular utility in catalyst manufacture.

While a number of various amorphous metallic oxides can be prepared in accordance with the instant invention including those of aluminum, scandium, gallium, titanium, germanium, zirconium, tin, hafnium, vanadium, chromium and thorium and mixtures thereof, the instant invention will be illustrated by the following description for the preparation of amorphous alumina.

Amorphous alumina is a well-known material. Heretofore this material was believed to be of little value in the field of catalysis and hence prior art efforts have been to minimize the amount of amorphous alumina which was inherently produced in former processes for preparing the various crystalline forms of alumina. Recently however it has been discovered that amorphous alumina has certain catalytic properties not possessed by the crystalline forms thereof. This catalytically active form of alumina has aroused considerable interest in research workers and as a result a substatnial amount of research effort is now being expended in attempts to prepare alumina which is essentially noncrystalline, i.e., amorphous.

It is well known that by the addition of a base to an aqueous solution of an aluminum salt, there is produced a flocculent gelatinous precipitate. This precipitate begins to crystallize almost as soon as it is formed. Subsequent processing results in hydrated alumina products which after drying and upon examination by X-ray diffraction show evidence of fairly well-developed crystalline structures commonly known as gamma-alumina and eta-alumina.

A method has now been found whereby a stable alumina product can be prepared which before and after drying and upon examination by X-ray diffraction exhibits no crystallinity and thus is identifiable as an amorphous alumina. The stable amorphous alumina produced in accordance with this invention will not crystallize even upon extensive heating at a temperature of about 500° C.

In accordance with this invention a dilute solution of an aluminum salt is added to a saturated solution of ammonium carbonate or ammonium bicarbonate to form the alumina gel. The temperature of the saturated solution should be maintained in the range of −10° C. to 50° C. Apparently, there is formed an unstable aluminum carbonate, which slowly loses carbon dioxide and forms an alumina hydrogel. This phenomenon is somewhat analogous to that which occurs under certain conditions when an acid is added to a solution of sodium silicate, and there is formed a silica hydrogel instead of a gelatinous percipitate of silica.

The saturated solution of the ammonium carbonate or bicarbonate to which has been added the dilute solution of the aluminum salt tends to become quite viscous prior to the formation of the gel. During this viscous stage, apparently carbon dioxide is continuously liberated from the unstable aluminum carbonate and causes the viscous solution to swell or rise in a manner not unlike that of yeast in bread dough. The gel so produced is glassy and relatively transparent.

It is important to the success of this invention that the saturated solution of ammonium carbonate or bicarbonate, to which is added the dilute solution of an aluminum salt, be kept at a relatively low temperature, i.e., 50° C. or less with a preferred temperature in the range of −10° C. to 30° C. If the temperature of the solution is allowed to exceed about 50° C., undesired precipitates can form which later crystallize and thus contaminate the amorphous product.

The aluminum salt which is used to prepare the saturated solutions can be any aluminum salt which has an appreciable solubility in cold water. Suitable salts include aluminum acetate, aluminum sulfate, aluminum chloride, aluminum bromide, aluminum nitrate, etc. Aluminum chloride and aluminum sulfate are the preferred salts.

As used in this specification and appended claims the term "dilute" as applied to solutions shall means a concentration of less than 10 percent by weight.

The relative amounts of aluminum salt and ammonium carbonate or ammonium bicarbonate to be used in this invention can vary over a wide range. They should, however, be used in approximately stoichiometric quantities in order not to waste reactants. While amounts in the range of from about 0.7 to about 1.5 times the calculated stoichiometric quantities of ammonium carbonate or ammonium bicarbonate can be used, for optimum results, it is preferred to use from 0.9 to 1.1 times the calculated stoichiometric amount.

When the alumina gel is prepared in accordance with the methods described above, it should be immediately (for example within 3 hours after the formation thereof) washed with water to remove soluble salts therefrom as soon after its initial formation as possible. This step is of extreme importance in that if the alumina gel is allowed to sit for an appreciable length of time it tends to take on a crystalline form and the desired amorphous form will not be obtained.

After washing, the gel is dried at a temperature below 100° C. or oven vacuum dried below 150° C. and thereafter calcined at a temperature in the range of 300° C. to 500° C. The preferred drying temperature is in the range of 70° C. to 100° C. The calcining temperature should not be allowed to exceed about 500° C. since at such high temperature the alumina will begin to crystallize and the advantages of the amorphous alumina and its enhance catalytic activity will be lost.

This invention will be further understood by reference to the following examples.

Example I

A saturated aqueous solution of aluminum chloride was diluted 10:1 and cooled to 0° C. A saturated aqueous solution of ammonium carbonate was prepared and cooled to 0° C. The aluminum chloride solution was added to the ammonium carobnate solution while maintaining the temperature at about 0° C. A solid gel was obtained which was washed with water until the washings were free of chloride ions. The gel was dried at 70° C. for 4 hours and calcined at 400° C. for 2 hours. The resulting alumina was amorphous as measured by X-ray diffraction and had a surface area of 170 m.²/g.

Example II

Example I was repeated with the exception that the solid gel was not washed with water until free of chloride ions. The resulting alumina was crystalline as measured by X-ray diffraction and had a surface area of 295 m.²/g.

Example III

Example I was repeated with the exception that a saturated aqueous solution of ammonium bicarbonate was used instead of ammonium carbonate. The resulting alumina was amorphous as measured by X-ray diffraction and had a surface area of 160 m.²/g.

Example IV

Example III was repeated with the exception that the solid gel was not washed with water. The resulting alumina was crystalline as measured by X-ray diffraction and had a surface area of 270 m.²/g.

Example V

Example I was repeated with the exception that solid ammonium carbonate was used instead of a saturated solution of ammonium bicarbonate. The resulting alumina was amorphous and had a surface area of 136 m.²/g.

Example VI

Example I was repeated with the exception that solid ammonium bicarbonate was used. The product obtained was crystalline as measured by X-ray diffraction.

When other aluminum salts or metal salts as defined above are used instead of aluminum chloride in the foregoing examples, substantially identical results are obtained.

Exceptionally active catalysts, for example, for the reforming of petroleum naphthas, can be prepared by impregnating the amorphous alumina prepared in accordance with this invention with a solution of platinum chloride which is subsequently reduced to elemental platinum so that the finished catalyst contains between 0.3 and 1.0 percent platinum by weight. The amorphous alumina of this invention can also be used as a support for cobalt molybdate or nickel molybdate in preparing desulfurization, denitrogenation or hydrogenation catalysts.

As stated above, the instant invention can be utilized for preparing mixed amorphous metallic oxides. For example, if it is desired to prepare a mixed aluminum-chromium amorphous oxide, a saturated solution of aluminum chloride can be prepared to which can be added chromium chloride in any convenient amount; for example, 10% by weight. If any aluminum chloride is "salted out" such is immaterial to the success of this invention. The solution is merely filtered and to the filtrate containing $Al^{+++}$ and $Cr^{+++}$ there is added ammonium carbonate or ammonium bicarbonate. The remainder of the procedure is as described above.

We claim:
1. Method for preparing amorphous alumina which comprises
   (a) adding a dilute aqueous solution of an aluminum halide to a saturated aqueous solution of an ammonium salt selected from the group consisting of ammonium carbonate and ammonium bicarbonate maintained at a temperature in the range of −10° C. to 50° C. to precipitate an alumina gel,
   (b) immediately washing said gel with water until the washings are substantially free of halide ions,
   (c) drying said gel at a temperature less than 100° C., and
   (d) calcining the dry gel at a temperature in the range of 300° C. to 500° C.
2. Method for preparing amorphous alumina which comprises
   (a) adding a dilute aqueous solution of aluminum chloride to a saturated aqueous solution of ammonium carbonate maintained at a temperature in the range of −10° C. to 50° C. to precipitate an alumina gel,
   (b) immediately washing said gel with water until the washings are substantially free of chloride ions,
   (c) drying said gel at a temperature in the range of 70° C. to 100° C., and
   (d) calcining the dry gel at a temperature in the range of 300° C. to 500° C.
3. Method for preparing amorphous alumina which comprises
   (a) adding a dilute aqueous solution of aluminum chloride to a saturated aqueous solution of ammonium bicarbonate maintained at a temperature in the range of −10° C. to 50° C. to precipitate alumina gel,
   (b) immediately washing said gel with water until the washings are substantially free of chloride ions,
   (c) drying said gel at a temperature in the range of 70° C. to 100° C., and
   (d) calcining the dry gel at a temperature in the range of 300° C. to 500° C.

References Cited

UNITED STATES PATENTS

| | | | |
|---|---|---|---|
| 1,929,942 | 10/1933 | Barclay | 23—143 |
| 2,973,329 | 2/1961 | Koch et al. | 23—143 X |
| 3,132,110 | 5/1964 | Hansford | 23—143 X |
| 3,264,061 | 8/1966 | Kehl et al. | 23—143 X |
| 3,038,784 | 6/1962 | Torkar et al. | 23—143 |
| 3,193,349 | 7/1965 | Mooi | 23—143 |
| 3,264,062 | 8/1966 | Kehl et al. | 23—141 |

OTHER REFERENCES

Handbook of Chemistry and Physics, 36th ed., Chemical Rubber Publishing Co., 1955, p. 1623.

Merck Index, 7th ed., Merck & Co., 1960, p. 65.

Newsome et al., "Alumina Properties," Aluminum Company of America, 1960, pp. 68–71 (pp. 70 and 71 relied on).

OSCAR R. VERTIZ, *Primary Examiner.*

CARL D. QUARFORTH, S. TRAUB, G. T. OZAKI,
*Assistant Examiners.*